United States Patent
Bishop et al.

(12)

(10) Patent No.: US 6,500,892 B1
(45) Date of Patent: Dec. 31, 2002

(54) INTERCALATED CLAY USEFUL FOR MAKING AN α-OLEFIN POLYMER MATERIAL NANOCOMPOSITE

(75) Inventors: C. Edward Bishop; Suhas G. Niyogi, both of Hockessin, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 157 days.

(21) Appl. No.: 09/596,090

(22) Filed: Jun. 16, 2000

(51) Int. Cl.$^7$ .................................................. C08K 3/34

(52) U.S. Cl. ...................... 524/445; 524/186; 501/148

(58) Field of Search ................................ 524/186, 445, 524/447, 448, 449; 501/145, 146, 148

(56) References Cited

U.S. PATENT DOCUMENTS

| | | | |
|---|---|---|---|
| 4,187,210 A | * | 2/1980 | Howard, Jr. ............ 260/42.14 |
| 4,310,547 A | | 1/1982 | Hunt et al. |
| 4,510,331 A | | 4/1985 | Yoshimura et al. |
| 5,143,549 A | * | 9/1992 | Howard, Jr. ............... 106/499 |
| 5,552,469 A | | 9/1996 | Beall et al. |
| 5,554,671 A | | 9/1996 | Craun et al. |
| 5,739,397 A | | 4/1998 | Adkins et al. |
| 5,760,121 A | | 6/1998 | Beall et al. |
| 5,840,796 A | | 11/1998 | Badesha et al. |
| 5,853,886 A | | 12/1998 | Pinnavaia et al. |
| 5,880,197 A | | 3/1999 | Beall et al. |
| 5,910,523 A | | 6/1999 | Hudson |

FOREIGN PATENT DOCUMENTS

| | | |
|---|---|---|
| DE | 3145455 | 5/1983 |
| EP | 0541037 | 5/1993 |
| JP | 60067425 | 4/1985 |
| JP | 62298561 | 6/1986 |
| WO | 9743274 | 11/1997 |
| WO | 9920722 | 4/1999 |

OTHER PUBLICATIONS

Usuki, A; Kato, M; Okada, A; Kurauchi, T J. Appl. Poly. Sci. vol. 63, 137–139 (1997).*
Kurokawa, Y; Yasuda, H; Oya, A; J. Mat. Sci. Letters 15(1996) 1481–1483.*
Database CAPLUS on STN, Acc. No. 1968, KATES et al., Absolute sterochemical configuration of phytanyl (dihydrophytyl) groups in lipids on Halobacterium cutirubrum. Biochemistry (1967), 6(11), pp. 3329–38 (abstract).
Database CAPLUS on STN, Acc. No. 1969: 11023, JOO et al., 'Characterization and synthesis of mono–and diphytanyl ethers of glycerol.' J. Lipid Res. (1968), 9(6), pp. 782–8 (abstract).
Database CAPLUS on STN, Acc. No. 1970: 455294, WOLFF et al., 'Utility of dicyanomethylene derivatives in structural studies of long–chain aliphatic acids by mass spectrometry.' Tetrahedron Lett. (1970), 31, pp. 2719–22 (abstract).
MacKenzie et al., The effect of maturation on the configuration of acyclic isoprenoid acids in sediments.' Geochim. Cosmochim. Acta (1882), 46(5), pp. 783–92 (abstract).
C. Mancuso, et al., J. Lipid Res., 26(9): 1120–5 (1985).
A. K. Sen Gupta et al., Industrieverlag Von Hernhaussen KG, vol. 68(5): 349–360 (1966).
N. Nagahama et al., Chem. Pharm. Bull. 19(4): 660–6 (1971).
Y. Ando et al., J. Am Oil Chem. Soc., 69(5): 417–24 (1992).
J. Cason et al., Tetrahedron, vol. 7: 189–298 (1959).

* cited by examiner

Primary Examiner—Edward J. Cain
Assistant Examiner—Kat Wyrozebski Lee

(57) ABSTRACT

Disclosed is clay material, the particles of which are intercalated with a compound comprising a saturated isoprene oligomer bonded to a polar group. In a preferred embodiment the polar group is a quaternary ammonium radical. Further disclosed is a nanocomposite comprising $C_2$–$C_3$ α-olefin polymer material, and, dispersed in the matrix of the olefin polymer material, exfoliated clay material, the particles of which before exfoliation were intercalated with said compound.

23 Claims, No Drawings

INTERCALATED CLAY USEFUL FOR MAKING AN α-OLEFIN POLYMER MATERIAL NANOCOMPOSITE

FIELD OF THE INVENTION

The invention is in the chemical arts. It relates to clays, the particles of which are water swellable, the intercalation and exfoliation of such particles, and synthetic resin compositions comprising the exfoliated particles.

BACKGROUND OF THE INVENTION

Clays are silicate minerals, the particles of which have equivalent spherical diameters of less than 2 μm. For many years clay has been used in synthetic resin compositions (in more common terminology, polymer compositions) to enhance or impart toughness, heat deflection temperature, oxygen barrier and optical properties of or to the compositions. Such use has led to the development of nanocomposites. These are compositions that comprise normally solid, polymer material and, highly dispersed in the matrices of the polymer material, diminuted clay particles. These particles are in the form of platelets, the thicknesses of which are measured in nanometers. Diminuted clay particles of such fineness are obtained from water swellable clays which include crystalline clays that belong to the class of layer silicates, also referred to as phyllosilicates. The phyllosilicates include the smectite (or montmorillonite), mica and vermiculite groups of clays. The particles of these minerals are formed by layers or laminates of crystalline silicate platelets. The layers are strongly held together by electrochemical attraction. When these minerals are exposed to water, it diffuses into the particles between the layers, and causes the layers to move apart, (as evidenced by expansion or swelling of the particles), whereby the layers are not as strongly held together. When these minerals are subjected to drying conditions, water between the layers escapes and evaporates, and the particles shrink.

One method of obtaining the diminuted clay particles is based on this water swelling effect. In the method, an aqueous solution or dispersion of an organoelectrolyte, and water swellable clay such as a phyllosilicate are admixed. The solution or dispersion migrates into the phyllosilicate particles between the layers, and forces the layers apart. Water is evaporated from the particles. However, because of the electrolytic portion of the organoelectrolyte, it remains between the layers of silicate platelets, and because of the bulk of the organo portion, the layers remain spaced apart. The resulting swollen particles are described as intercalated, and the organoelectrolyte is referred as the intercalant. In such condition substantially less shear is needed to separate the platelet layers from each other. Sufficient shear is applied to the intercalated particles to overcome the forces holding the layers together, and delaminate them, whereby diminuted clay particles are obtained. Such particles are referred to as exfoliated clay particles. In most instances, the shear involved in the melt blending of the polymer material and the intercalated, phyllosilicate particles is sufficient to exfoliate the particles.

There are numerous patent and other publications relating to nanocomposites, how to make them, and the preparation of intercalated clays for use in making nanocomposites. Representative of such publications is the U.S. Pat. No. 5,552,469 to Beall et al. This patent discloses nanocomposites in which examples of the matrix polymers (from which the normally solid polymer material of the patent is selected) comprise such homopolymers as polyethylene and polypropylene, and such copolymers as propylene copolymers and ethylene copolymers with ethylene-propylene copolymers and ethylene-propylene-diene terpolymers being mentioned. The clay disclosed in the patent is a phyllosilicate such as a smectite clay and the intercalant disclosed in the patent includes an oligomer with carbonyl, hydroxyl, carboxyl, amine and/or ether functionalities.

SUMMARY OF THE INVENTION

The invention comprises a clay material intercalated with intercalant material comprising an organic compound having a nonpolar portion bonded to a polar portion. The nonpolar portion for the most part is a saturated oligomer of isoprene. It resembles or mimics the basic structure or parts of the basic structure of the hydrocarbon backbone of homopolymers and copolymers of propylene and of ethylene. This portion, therefore, tends to be compatible with such polymers, especially copolymers of both propylene and ethylene. The polar portion tends to have an affinity for the silicate platelets of the clay material. Consequently, the organic compound enhances the compatibility with such polymers of the exfoliated, clay material that results when melt blending, with sufficient shear to exfoliate the intercalated clay material, the polymers and the clay material intercalated with the intercalant material.

The invention further comprises a nanocomposite containing a $C_2$–$C_3$ α-olefin polymer material and dispersed in the matrix thereof an exfoliated, clay material that before exfoliation had been intercalated with intercalant material comprising the foregoing organic compound. The $C_2$–$C_3$ α-olefin polymer material is material selected from the group consisting of homopolymers of propylene and ethylene, α-olefin copolymers in which polymerized propylene units predominate, α-olefin copolymers in which polymerized ethylene units predominate, copolymers of propylene and ethylene or propylene and butene-1 in which the polymerized propylene and ethylene units or propylene and butene-1 are substantially equal in number and together predominate, the latter copolymers of propylene and ethylene or propylene and butene-1 being with or without other different polymerized $C_4$–$C_{10}$ α-olefin units, and mixtures thereof

DETAILED DESCRIPTION OF THE INVENTION

In the more specific aspects of the invention, the essential component of the intercalant material, that is, the above mentioned organic compound, has the general formula:

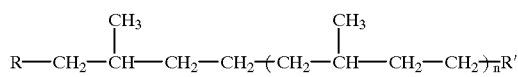

in which R is H or a normal or branched $C_1$–$C_4$ alkyl, n is 2–17, and R' is a radical with at least one polar group or moiety. In most embodiments of the compound, R' is X, COOR", CN, NR'''$_2$ or NR'''$_2$·HX with R" being R''', NR'''$_2$, NR'''$_2$·HX or a monovalent metal cation, R''' being H or a normal or branched $C_1$–$C_4$ alkyl and X being I, Br, Cl or F. In each of NR'''$_2$ or NR'''$_2$·HX, each R''' can be the same or different. However, in preferred embodiments, R" is NHR'''·HX. Examples of a normal or branched $C_1$–$C_4$ alkyl are methyl, ethyl, n-propyl, isopropyl, n-butyl, sec-butyl and tert-butyl. Examples of a monovalent metal cation include cations of an alkali metal in Group 1A of the Periodic Table of the Elements (e.g., Li, Na, and K).

One way to make the generic compound comprises condensing isoprene anionically with a $C_1$–$C_4$ alkyllithium to form an oligomer of 3–18 isoprenoid units with $C_1$–$C_4$ alkyl being a substituent of a methyl carbon of the end isopropyl group of the unsaturated hydrocarbon backbone, and with lithium being an ionically attached to the methylene carbon at the other end of the backbone. The oligomer is reacted with either ethylene oxide or carbon dioxide, and then with water, to replace the lithium ion with a hydroxyethyl group or a carboxyl group. In either case the resulting compound is hydrogenated over a Pt or Rh catalyst to saturate the backbone. The hydrogenation reaction is typically done at 35 to 40° C. in hexane for 8–12 hours.

The saturated, hydroxyethyl substituted compound is halogenated with a hydrogen halide (hydrogen bromide or iodide being preferred because of the ease of reaction) to form a compound of the formula in which R' is X. This halide compound is reacted with (1) an alkali metal cyanide to obtain a compound in which R' is CN, and (2) ammonia (or ammonium hydroxide), or a mono- or di($C_1$–$C_4$alkyl) amine to obtain a compound in which R' is $NR'''_2$. The latter compound is reacted with a hydrogen halide to obtain a compound in which R' is $NR'''_2 \cdot HX$. The saturated, carboxy substituted compound is reacted with (1) a $C_1$–$C_4$ alcohol to form the compound, an ester, in which R" is $C_1$–$C_4$ alkyl, (2) ammonia (or ammonium hydroxide), or a mono- or di($C_1$–$C_4$alkyl)amine to obtain a compound in which R" is $NR'''_2$, and (3) an alkali metal base to give a compound in which R" is a monovalent metal (alkali metal) cation. Similar to the above, the aminocarboxymethyl compound (in which R" is $NR'''_2$) is reacted with a hydrogen halide to obtain a compound in which R" is $NR'''_2 \cdot HX$. All of the reactions described in this paragraph are conventional type reactions, and the general conditions thereof are well known to organic chemists of ordinary skill in the art.

A highly preferred embodiment of the compound, and a precursor of other embodiments of the compound is 3,7,11-trimethyldodecyl halide. A process for making the embodiment starts with 3,7,11-trimethyldodecatriene-1-ol, a naturally occurring isoprenoid known as farnesol. In the process this chemical is catalytically hydrogenated to 3,7,11-trimethyldodecan-1-ol which in turn is halogenated. The resulting halide is reacted as above indicated with respect to the generic halide compound to obtain the various other R' radicals. Thus, the resulting halide is reacted with a $C_1$–$C_4$ alkyl amine to form $C_1$–$C_4$ alkyl (3,7,11-trimethyldodecyl) amine. This amine compound then is reacted with a hydrogen halide to form the quaternary compound 3,7,11-trimethyldodecylamine hydrohalide. This quaternary ammonium compound is a preferred compound because of its higher affinity, compared to the other, non-quaternary ammonium embodiments of the generic compound, with phyllosilicates, especially semectites.

As above stated, the generic compound has a general affinity for silicate platelets such as those in phyllosilicates, and general compatibility with $C_2$–$C_3$ α-olefin polymer material. However, the degree of affinity for the silicate platelets varies from one specific embodiment of the compound to another, depending to a large extent on the composition of the platelets and the degree of polarity of R'. Similarly, the degree of compatibility with the polymer material varies from one specific embodiment of the compound to another, depending to a large extent on the value of n in the formula. Nevertheless, in each case there is significant enhancement of the compatibility of the silicate platelets with the polymer material when the generic compound is combined with the platelets. In addition, the generic compound tends to be in melted condition at the same temperatures at which such polymer material is molten, and this has a favorable effect on compatibility when the intercalated clay particles are admixed with the polymer material in the melted condition, and under sufficient shear to exfoliate the particles.

In some embodiments of the invention the intercalant material comprises only one compound within the scope of the above general formula. In other embodiments it comprises more than one such compound. These other embodiments are typical when intercalant material is made from isoprene.

In all embodiments of the invention substantially all of the clay material is water swellable. In some of these embodiments the clay material comprises only one variety of water swellable clay. In other embodiments it comprises more than one such variety. These embodiments include those having clay in one group of the phyllosilicate class (for example, the smectite group), and another clay in another group of the class (for example, the vermiculite group), and embodiments in which all the clays are in one phyllosilicate group. In the more preferred embodiments the clay or clays is or are in the smectite group.

The intercalated, clay material of this invention is made by preparing an aqueous solution or suspension of the intercalant material, admixing water swellable clay material and the solution or suspension, and, when enough of the solution or suspension has infiltrated and been sorbed by the clay material to substantially swell the particles thereof, the thus intercalated clay material is separated from the aqueous solution or suspension and dried.

In the preparation of an aqueous solution or suspension of intercalant material, the amount of intercalant material admixed with the liquid generally is such that the concentration of the material in the solution or suspension is about 10–50 parts by weight of the solution or suspension. Solubility of the intercalant material in water is dependent for the most part on the carbon chain length or lengths (i.e., the absolute or average value of n in the general formula) and to a lesser extent on the degree of polarity or polarities of the polar portion or portions of the compound or compounds. The shorter the chain lengths (the smaller the value of n, e.g., from 2 to 10), the greater is the solubility. The more polar the polar portion, the greater is the solubility. The optimum chain length for compatibility of the compound or compounds of the intercalant material with $C_2$–$C_3$ α-olefin polymer material appears to exist when the absolute or average value of n is 12. At the absolute or average chain length corresponding to this number, the solubility of the intercalant material in water might only be partial. In such case a water-miscible solvent for the compound, for example, a $C_1$–$C_4$ alcohol (methanol, ethanol, and the like) can be part of the liquid medium. The concentration of the water-miscible solvent should be sufficient so that at least an easily stirrable suspension of the intercalant material is formed when the material is admixed with the water-solvent solution. This preparation of the aqueous solution or suspension normally is carried out at 20–25° C. and atmospheric pressure. However, operable higher and lower temperatures and pressures are within the broader concepts of the invention.

The relative amounts of the solution or suspension admixed with the water swellable clay material can vary. However, satisfactory results are obtained when the amounts are such that the weight ratio of intercalant material to the clay material is generally about 20:100–40:100, and preferably about 27:100–32:100.

The period of time the water swellable clay material is in contact with the aqueous solution or suspension is dependent on the rate of infiltration or migration of the solution or suspension into and its sorption by the clay material. This in turn is dependent on the clay or clays that make up the clay material. Preferably, the period should be sufficient to achieve maximum or substantially maximum swelling of the clay particles. To determine the period, test runs, which can be readily done, are recommended. However, a period of time of generally about 1–12 hours and preferably about 6–8 hours gives satisfactory results.

These steps of the preparation of the intercalated, clay material are performed in conventional equipment.

As to the nanocomposite of this invention, the concentration of the exfoliated, intercalated clay material component thereof is dependent on the desired physical properties of the articles made therefrom. However, in general the concentration is about 2–25 parts by weight of the nanocomposite, and preferably about 5–15 parts by weight of the nanocomposite.

While the essential components of the nanocomposite are $C_2$–$C_3$ α-polymer material and the exfoliated, intercalated clay material of this invention, specific embodiments of the nanocomposite include at least one other additional component. That additional component is antidegradant material (material selected from antioxidants, heat stabilizers, and the like). Other additional components include material selected from the group comprising antacids, colorants, compatibilizers other than the intercalant material of this invention, and the like, including other substances not here listed, but conventionally in nanocomposites.

The nanocomposite of this invention is made by melt blending $C_2$–$C_3$ α-olefin polymer material, the intercalated clay material of this invention, preferably antidegradant material, and such other components as might be involved in the embodiment being made. In this regard, one of the general embodiments of the nanocomposite is a concentrate or masterbatch, and in specific embodiments thereof one or more of such other components are not included until the concentrate and such other components are melt blended with additional $C_2$–$C_3$ α-olefin polymer material to make the ultimate polymer composition for forming useful articles.

The melt blending of at least the $C_2$–$C_3$ α-olefin polymer material and the intercalated clay material of this invention is done by conventional ways and means. In doing so, the shear applied to achieve a uniform blend usually is sufficient to exfoliate the intercalated clay material and, with the aid of the intercalant material, distribute the resulting exfoliated platelets uniformly throughout the melted $C_2$–$C_3$ α-olefin polymer material.

After the nanocomposite of this invention is made and still is in the molten condition, it can be used as is to manufacture by conventional ways and means useful solid articles or solid pellets for later manufacture of useful articles.

The invention is not limited to these examples. All percentages and parts are by weight unless otherwise expressly stated.

EXAMPLE 1

This example illustrates how to make intercalant material comprising n-butyl (3,7,11-trimethyldodecyl) amine hydrochloride starting with farnesol.

A suspension of $PtO_2$ (45.3 mg, 0.2 mmol) in dry hexane (2 ml) is stirred at 20–25° C. under 0.28 MPa (40 psi) of hydrogen for 10 min. It then is admixed with a solution of farnesol (95%, mixture of isomers; 503 mg, 2.27 mmol) in hexane (1 ml). The resulting mixture is stirred at 20–25° C. under 0.62 MPa (90 psi) of hydrogen for 15–16 hrs. The reaction mixture thus obtained is filtered to remove the $PtO_2$, and the filtrate is vacuum distilled to remove the hexane. A typical gas chromatography/mass spectrum analysis of the product that remains reveals full conversion of farnesol to 3,7,11-trimethyldodecan-1-ol (88.9%), 2,6,10-trimethyldodecane (10.2) and some unidentified by-products (0.9%).

To a stirred solution of hydrobromic acid (212 g of 48% aqueous solution) in a one liter round bottom flask is added concentrated sulfuric acid (36 ml) at 20–25° C. After about 30 minutes, the above 3,7,11-trimethyldodecan-1-ol product is added dropwise to the flask while continuously stirring the flask contents. The resulting solutions is is heated to bring it to a gentle boil, and refluxed for about 8 hours. It then is cooled and added to ice cold water (1 liter). The organic layer is separated and washed with cold concentrated sulfuric acid, then a dilute (~2%) aqueous solution of sodium bicarbonate, and finally water. The thus washed reaction product is extracted with hexane. The resulting hexane solution is washed with water, dried over anhydrous magnesium sulfate, and stripped of hexane under 50 mm mercury vacuum. The product thus obtained, as confirmed by gas chromatography/mass spectrum analysis consists essentially of 3,7,11-trimethyldodecyl bromide with the product yield being about 93%.

The bromide product is dissolved in toluene (300 ml) in a one liter round bottom flask. While the toluene solution is stirred, n-butyl amine (71 g) is added dropwise. The resulting solution brought to a gentle boil, and refluxed for 6 hours. The flask contents are cooled, transferred to a separatory funnel, and shaken with water (500 ml). The aqueous layer is discarded. The organic layer is washed three times with water (500 ml), dried over anhydrous magnesium sulfate, filtered, stripped of toluene at 50 mm of mercury pressure, and vacuum distilled (1 mm of mercury pressure) at 160–165° C. to remove residual toluene. The product thus isolated consists essentially of n-butyl (3,7,11-trimethyldodecyl) amine at typically 99+% purity and 93.2% yield.

The amine product (10 g, 35.4 mmol) is dissolved in anhydrous hexane (100 ml) at 20–25° C. Dry hydrogen chloride gas is bubbled slowly through the resulting solution until it is saturated with hydrogen chloride, whereby solid amine hydrochloride precipitates to form a suspension. Dry nitrogen is bubbled through the suspension to remove excess hydrogen chloride. The suspension is filtered. The filtered solid is washed with anhydrous hexane, and subjected to vacuum at 20–25° C. until substantially all of the hexane has evaporated. The solid product thus obtained (typically 11.3 g) consists essentially of n-butyl (3,7,11-trimethyldodecyl) amine hydrochloride.

EXAMPLE 2

This example illustrates a preferred specific embodiment of intercalated, clay material of this invention, and its preparation.

A smectite clay (40 g) is dispersed in a solution of deionized water (2000 ml) and methanol (30 ml). The resulting suspension is stirred at 20–25° C. for 48 hours.

Amine hydrochloride product (19 g, 59.46 meq)) of Example 1 is dissolved in deionized water (200 ml).

The clay suspension is heated to 60° C., and, while stirring the suspension vigorously, the amine hydrochloride product solution is added dropwise to it over a period of 4 hours. The stirring of the suspension is continued at 60° C. for 8 hours. After cooling the suspension to 20–25° C., the suspension is filtered, and the filter cake is washed with deionized water, air dried, ground to break up the particle agglomerates, and finally dried in a vacuum oven at 70–80° C. for 72 hours.

The finely divided solid product (58 g) thus obtained consists essentially of a smectite clay intercalated with the amine hydrochloride product of Example 1. The product typically contains water at about 2% by weight, and the small angle X-ray diffraction d(001) spacing of the product is typically about 22 Å.

EXAMPLE 3

This example illustrates a preferred, specific embodiment of a nanocomposite of this invention, and its production. The $C_2$–$C_3$ α-olefin polymer material in this example consists essentially of a commercially available heterophasic copolymer product of ethylene and propylene comprising an ethylene-propylene rubber (60–62% by weight of the product), and propylene homopolymer (38–40% by weight of the product), with the total content of polymerized ethylene units being about 37% by weight of the product. The product is commercially available from Montell USA Inc.

Pellets (1100 g) of this copolymer product, finely divided, intercalated, smectite clay (60 g) of Example 2, and a conventional, finely divided, solid, phenolic antioxidant (2.2 g) are dry mixed. The resulting mixture is fed into and extruded at 200° C. from a 30 mm Leistritz extruder operated at a screw speed of 300 rpm at a feed rate of 9.1 kg (20 lb) per hour, and fitted with a slender rod forming die. The extrudate, a melt blend, is cooled until solid, and then cut-up to form pellets. The pellets are dried in an air oven at 75° C.

The pelletized product is a nanocomposite comprising a copolymer of propylene and ethylene, and highly dispersed therein exfoliated smectite clay along with the amine hydrochloride product of Example 1.

Standard physical property tests were conducted on ASTM flex and tensile bars molded with a 0.14 kg (5 oz) Battenfeld molding machine from the pelletized product of Example 3, and from a pelletized control product the same in all respects as the Example 3 product, except it had no clay content, and it did not contain any of the intercalant material in the Example 3 product. Comparison of the data obtained in the tests showed these improvements in physical properties of the Example 3 product compared to the physical properties of the control product:

| | |
|---|---|
| Flexural Modulus (ASTM D-790-97) | 18.2% |
| Flexural Strength (ASTM D-790-97) | 28.7% |
| Tensile Strength (ASTM D-638-97) | 6.6% |
| Yield Elongation (ASTM D-638-97) | 25% |
| HDT @ 0.46 MPa(66 psi) (ASTM D-648-98c) | 20% |

The Notched Izod Impact (ASTM D-256-97) value of the Example 3 product was 9 ft-lb/in with no break at 9.

EXAMPLE 4

This example illustrates a preferred, specific embodiment of a nanocomposite of this invention, and its production.

A homopolymer of propylene having a melt flow rate (MFR) of 25–30 g/10 min (ASTM D 1238 230° C./2.16 Kg) in pellet form (1053 g) commercially available from Montell USA Inc., a finely divided, intercalated, smectite clay of Example 2 (79 g), a conventional, commercially available, finely divided, solid, phenolic antioxidant (2.2 g) and pellets (20 g) of a commercially available maleated homopolymer of propylene (i.e. a maleic anhydride modified polypropylene) as an additional compatibilizer are mixed together and processed on a Banbury mixer at 160° C. (320° F.). The resulting mixture is cooled, ground, dried, and extruded at 200° C. from a 30 mm Leistritz extruder operated at a screw speed of 250 rpm at a feed rate of 6.8kg (15 lb) per hour, and fitted with a slender rod forming die. The extrudate, a melt blend, is cooled until solid, and then cut-up to form pellets. The pellets, which still contain water from the clay intercalation dried in an air oven at 75° C.

The pelletized product is a nanocomposite comprising polypropylene and, highly dispersed therein, exfoliated smectite clay along with the amine hydrochloride product of Example 1.

Standard physical property tests were conducted on ASTM flex and tensile bars molded as in Example 3 from the pelletized product of Example 4, and from a pelletized control product the same in all respects as the Example 4 product, except the clay was not intercalated and exfoliated, and no amine hydrochloride product of Example 1 was present. Comparison of the data obtained in the tests showed these improvements in physical properties of the Example 4 product compared to the physical properties of the control product:

| | |
|---|---|
| Notched Izod Impact (ASTM D-256-97): | 12.5% |
| Flexural Modulus (ASTM D-790-97): | 22.2% |
| Flexural Strength (ASTM D-790-97): | 28.7% |
| Tensile Strength (ASTM D-638-97): | 38.1% |
| Yield Elongation (ASTM D-638-97): | 79.1% |
| HDT @ 0.46 MPa(66 psi) (ASTM D-648-98c): | 26.7% |

These data demonstrate the vast superiority of the nanocomposite of this Example compared to an non-exfoliated clay filled composition.

Other embodiments of the invention will be readily apparent to those exercising ordinary skill after reading the disclosures of this specification. In this regard, while specific embodiments of the invention have been described in considerable detail, variations and modifications of these embodiments can be effected without departing from the spirit and scope of the invention as described and claimed.

What is claimed is:

1. Clay material intercalated with intercalant material comprising a compound having the general formula:

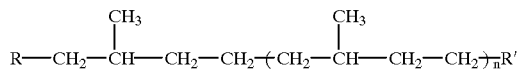

in which R is H or a normal or branched $C_1$–$C_4$ alkyl, n is 2–17, and R' is a radical with at least one polar group.

2. Clay material according to claim 1 in which in the general formula of said compound R' is X, COOR", CN, NR'''$_2$ or NR'''$_2$·HX with R" being R''', NR'''$_2$, NR$_2$·HX or a monovalent metal cation, R''' being H or a normal or branched $C_1$–$C_4$ alkyl, X being I, Br, Cl or F, and each R''' in NR'''$_2$ and NR'''$_2$·HX being the same as or different from the other R'''.

3. Clay material according to claim 2 in which in the general formula of said compound n is 3.

4. Clay material according to claim 3 in which in the general formula of said compound R is H.

5. Clay material according to claim 4 in which in the general formula of said compound R' is NR'''$_2$·HX.

6. Clay material according to claim 5 in which in the general formula of said compound, a first R''' in the NR'''$_2$·HX is H, and a second R''' in the NR'''$_2$·HX is a normal or branched C$_1$–C$_4$ alkyl.

7. Clay material according to claim 6 in which in the general formula of said compound the second R''' in said NR'''$_2$·HX is n-butyl and X is Cl.

8. A process for making intercalated clay material, which comprises establishing contact of water swellable clay material with an aqueous solution or suspension of intercalant material comprising a compound having the general formula:

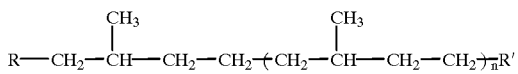

in which R is H or a normal or branched C$_1$–C$_4$ alkyl, n is 2–17, and R' is a radical with at least one polar group, and maintaining said contact until said clay material has become swollen.

9. A process according to claim 8, that comprises separating the thus intercalated clay material from the aqueous solution or suspension, and drying the separated intercalated clay material.

10. A process according to claim 9 in which in the formula n is 3, and R' is NR'''$_2$·HX, wherein one R''' is H, one R''' is a normal or branched C$_1$–C$_4$ alkyl, and X is Cl.

11. A process according to claim 10 in which said clay material is a phyllosilicate.

12. A process according to claim 11 in which the phyllosilicate is a smectite.

13. A nanocomposite comprising C$_2$–C$_3$ α-olefin polymer material, and, dispersed in the matrix of the olefin polymer material, exfoliated clay material along with intercalant material comprising a compound having the general formula:

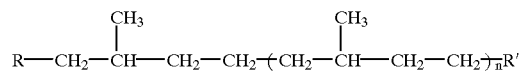

in which R is H or a normal or branched C$_1$–C$_4$ alkyl, n is 2–17, and R' is a radical with at least one polar group.

14. A nanocomposite according to claim 13 in which in the formula n is 3, and R' is NR'''$_2$·HX wherein one R''' is H, one R''' is a normal or branched C$_1$–C$_4$ alkyl, and X is Cl.

15. A nanocomposite according to claim 14 in which said clay material is a phyllosilicate.

16. A nanocomposite according to claim 15 in which the phyllosilicate is a smectite.

17. A nanocomposite according to claim 13 in which the C$_2$–C$_3$ α-olefin polymer material is a copolymer of propylene and ethylene.

18. A process for making a nanocomposite, that comprises melt blending C$_2$–C$_3$ α-olefin polymer material and clay material intercalated with intercalant material comprising a compound having the general formula:

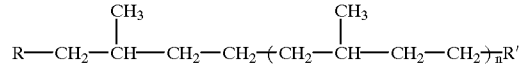

in which R is H or a normal or branched C$_1$–C$_4$ alkyl, n is 2–17, and R' is a radical with at least one polar group.

19. A process according to claim 18 in which in the formula n is 3, and R' is NR'''·HX, wherein one R''' is H, one R''' is a normal or branched C$_1$–C$_4$ alkyl, and X is Cl.

20. A process according to claim 19 in which said clay material is a phyllosilicate.

21. A process according to claim 20 in which the phyllosilicate is a smectite.

22. A process according to claim 21 in which the C$_2$–C$_3$ α-olefin polymer material is a copolymer of propylene and ethylene.

23. A process according to claim 18 in which the resulting melt blend is formed into a useful article and cooled until it has solidified.

* * * * *

UNITED STATES PATENT AND TRADEMARK OFFICE
CERTIFICATE OF CORRECTION

PATENT NO. : 6,500,892 B1
DATED : December 31, 2002
INVENTOR(S) : C. Edward Bishop et al.

It is certified that error appears in the above-identified patent and that said Letters Patent is hereby corrected as shown below:

Column 8,
Line 61, change "$NR_2 \cdot HX$" to -- $NR'''_2 \cdot HX$ --.

Signed and Sealed this

Twenty-third Day of November, 2004

JON W. DUDAS
*Director of the United States Patent and Trademark Office*